(12) United States Patent
Burlage et al.

(10) Patent No.: US 8,087,638 B2
(45) Date of Patent: Jan. 3, 2012

(54) APPARATUS TO CONTROL A FLUID FLOW CHARACTERISTIC OF FLUID REGULATOR BYPASS VALVES

(75) Inventors: Brian Burlage, Marshalltown, IA (US); Chris Metschke, Ames, IA (US); Kurtis Jensen, Marshalltown, IA (US); Chee Wee Goh, Singapore (SG); Eva Loh, Singapore (SG); Wendy Ang, Singapore (SG)

(73) Assignee: Fisher Controls International, LLC, Marshalltown, IA (US)

( * ) Notice: Subject to any disclaimer, the term of this patent is extended or adjusted under 35 U.S.C. 154(b) by 646 days.

(21) Appl. No.: 12/184,722

(22) Filed: Aug. 1, 2008

(65) Prior Publication Data

US 2010/0025603 A1  Feb. 4, 2010

(51) Int. Cl.
*F16K 47/00* (2006.01)
(52) U.S. Cl. ........................ 251/122; 251/118
(58) Field of Classification Search .................. 251/118, 251/121, 122, 333
See application file for complete search history.

(56) References Cited

U.S. PATENT DOCUMENTS

| 3,722,858 | A | * | 3/1973 | Sugimoto et al. | 251/209 |
| 5,090,450 | A | | 2/1992 | Pelech et al. | |
| 5,113,904 | A | * | 5/1992 | Aslanian | 137/556 |
| 5,439,030 | A | * | 8/1995 | Cazcarra Palleruelo | 137/614.11 |
| 5,868,160 | A | | 2/1999 | Cords et al. | |
| 6,536,472 | B2 | * | 3/2003 | Baumann | 137/625.3 |

FOREIGN PATENT DOCUMENTS

| JP | 11-173454 | 6/1999 |
| WO | 95/23307 | 8/1995 |

OTHER PUBLICATIONS

Patent Cooperation Treaty, "Written Opinion of the International Searching Authority," issued by the International Searching Authority in connection with related PCT application No. PCT/US2009/044799, mailed Jan. 6, 2010 (4 pages).

Patent Cooperation Treaty, "International Search Report," issued by the International Searching Authority in connection with related PCT application No. PCT/US2009/044799, mailed Jan. 6, 2010 (3 pages).

\* cited by examiner

*Primary Examiner* — John Fristoe, Jr.
(74) *Attorney, Agent, or Firm* — Hanley, Flight & Zimmerman, LLC

(57) ABSTRACT

Apparatuses to control a fluid flow characteristic of fluid regulator bypass valves are described. An example apparatus includes an insert having a body sized to be inserted in a passage of a bypass valve. The body includes an opening to fluidly couple a bore of the body to an outer surface of the body. The opening being shaped to produce a predetermined flow characteristic in response to at least a portion of a restrictor of the bypass valve moving relative to the opening to vary a fluid flow through the opening and the bypass valve.

17 Claims, 5 Drawing Sheets

APPARATUS TO CONTROL A FLUID FLOW CHARACTERISTIC OF FLUID REGULATOR BYPASS VALVES

FIELD OF THE DISCLOSURE

This description relates generally to an apparatus to control a fluid flow characteristic and, more specifically, to an apparatus to control a fluid flow characteristic of fluid regulator bypass valves.

BACKGROUND

Bypass adjustment screws are typically used in conjunction with a bypass passage or valve that may be included in a variety of process systems such as, for example, volume boosters. A volume booster is often used to increase the stroking speed of control valves or other devices. The volume booster may be activated based on different factors such as the size of a pressure input from a positioner, attaining a requisite pressure differential across the volume booster, and/or a position of a bypass adjustment screw relative to the bypass passage. Activating the volume booster causes the volume booster to deliver a fluid flow to an actuator to assist in changing the position of a valve or other devices coupled to the actuator.

A bypass adjustment screw of a volume booster can be adjusted to restrict a bypass passage which, in turn, changes the magnitude of a pressure input that activates the volume booster. For example, if the bypass adjustment screw substantially blocks or restricts the bypass passage, a relatively small pressure input will activate the volume booster because the requisite pressure differential is attained across the volume booster signal diaphragms at a relatively low input signal. Alternatively, if the bypass adjustment screw is adjusted so that the bypass passage is substantially unblocked or unrestricted (e.g., open), then a relatively large pressure input will be needed to activate the volume booster because the requisite pressure differential is attained across the volume booster at a relatively higher input signal.

Known bypass adjustment screws have a conical head that can be adjustably moved toward or away from a seat of the bypass passage. In particular, as the bypass adjustment screw is adjusted (e.g., turned), the conical head moves toward or away from the seat and, thus, changes the fluid flow rate and/or the amount of fluid that is allowed to flow through the bypass passage without activating the volume booster. The opening between the conical head and the seat typically provides a quick-opening flow characteristic. Such a quick-opening flow characteristic provides a maximum change in flow rate at low travel (i.e., a small adjustment of the bypass adjustment screw) and, thus, known bypass adjustment screws have a tendency to overshoot and/or undershoot the desired flow rate (e.g., provide too little or too much fluid flow through the bypass passage). As a result, the adjustment time required to calibrate the bypass adjustment screw may be increased significantly.

SUMMARY

The examples described herein relate to an apparatus to control a fluid characteristic of a fluid regulator bypass valve that includes an insert having a body sized to be inserted in a passage of a bypass valve. The body includes an opening to fluidly couple a bore of the body to an outer surface. The opening being shaped to produce a predetermined flow characteristic in response to at least a portion of a restrictor of the bypass valve moving relative to the opening to vary a fluid flow through the opening and the bypass valve.

DETAILED DESCRIPTION

Certain examples are shown in the above-identified FIG.ures and described in detail below. In describing these examples, like or identical reference numbers are used to identify common or similar elements. The FIG.ures are not necessarily to scale and certain features and certain views of the FIG.ures may be shown exaggerated in scale or in schematic for clarity and/or conciseness. Additionally, several examples have been described throughout this specification. Any features from any example may be included with, a replacement for, or otherwise combined with other features from other examples.

Figure 2:
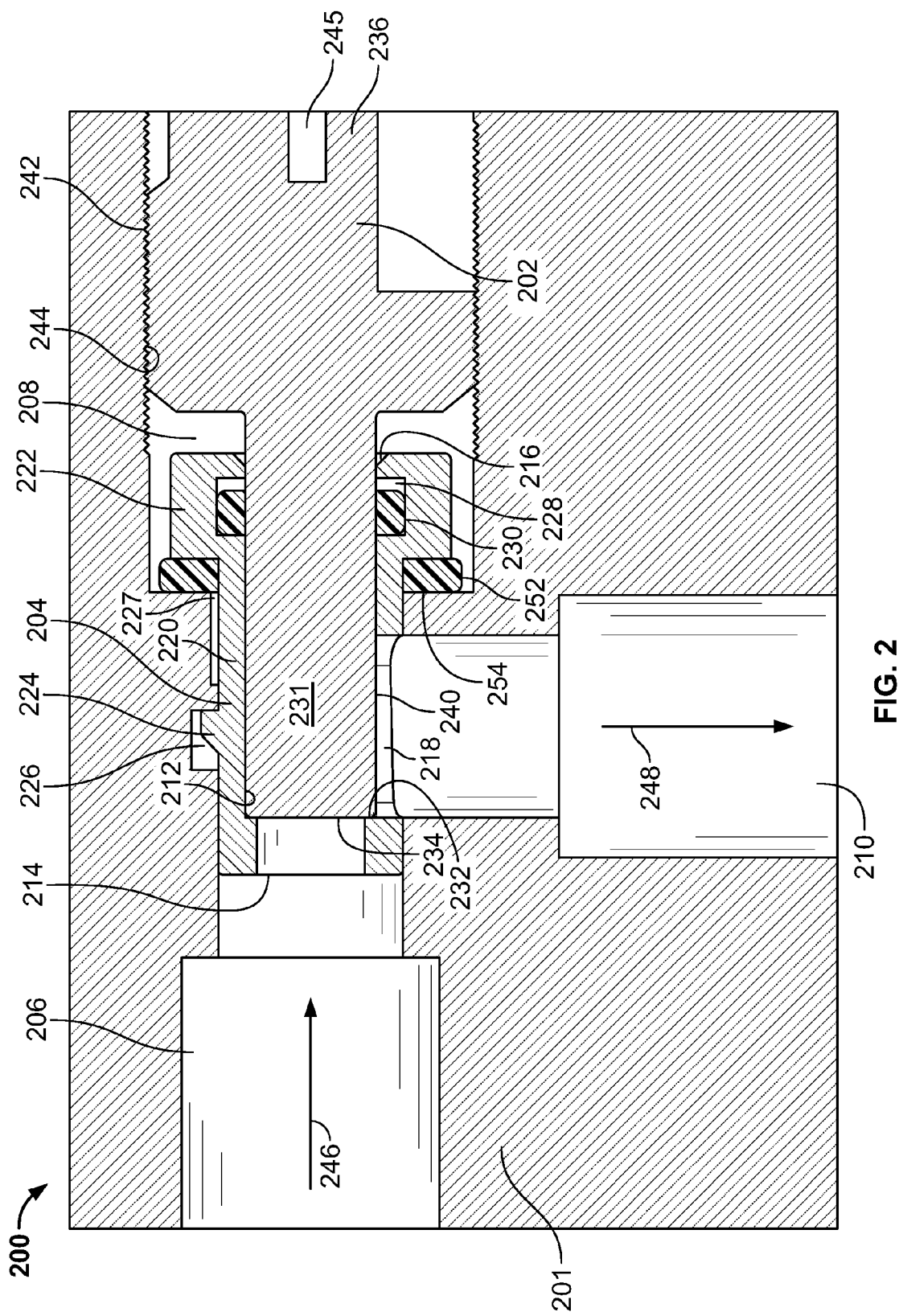
FIG. 2 depicts a side view of an example bypass valve.
Figure 7:
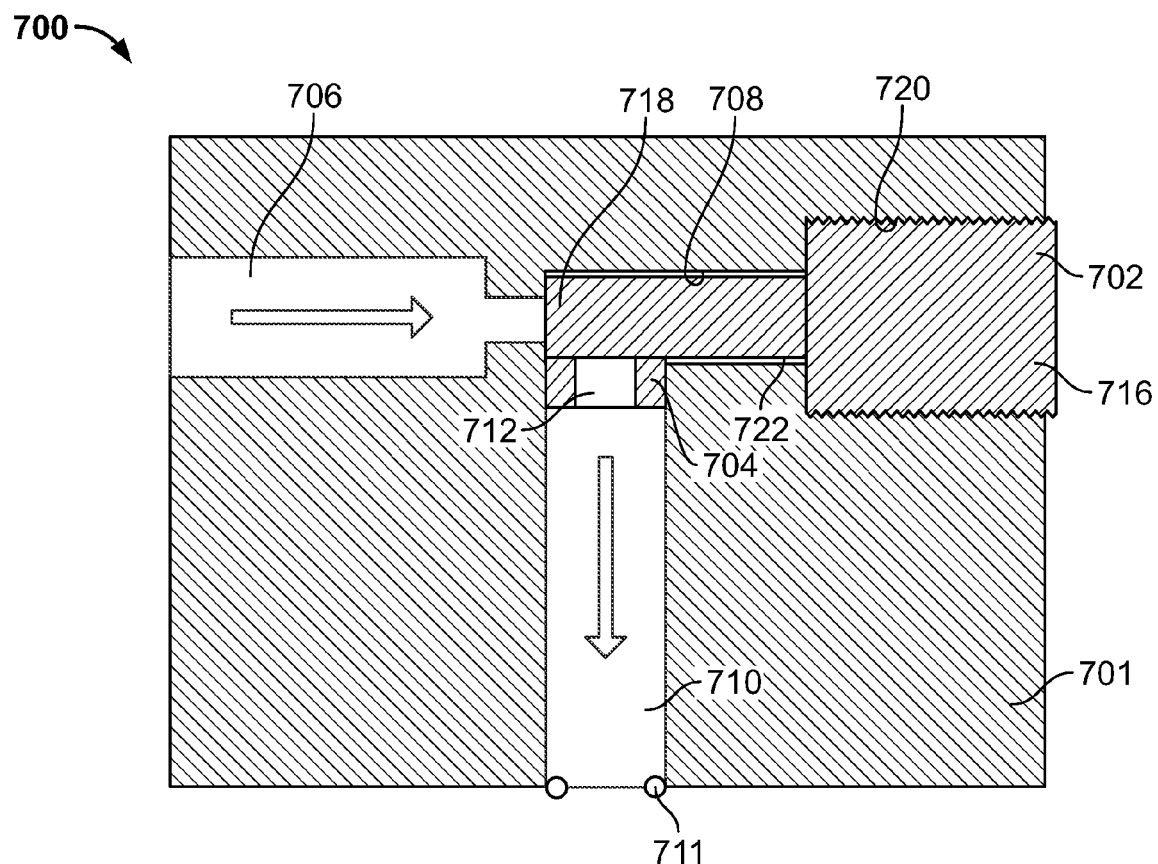
FIG. 7 depicts an alternative example bypass valve.

The example apparatus described herein is used to provide a predetermined flow characteristic in response to adjusting a bypass valve restrictor. Additionally, the example apparatus described herein can be used in conjunction with a known apparatus, such as a volume booster, to provide a desired, specific flow characteristic for use in a particular application. Further, the example apparatus described herein can be replaced and/or interchanged within such known apparatuses to change the flow characteristic and/or for any other suitable reason. In contrast to known bypass valves, the example apparatus described below in connection with FIGS. 2 and 7 are readily replaceable within a bypass valve body and provide a more accurate and versatile means to adjust the fluid flow through the bypass valve.

Figure 1:
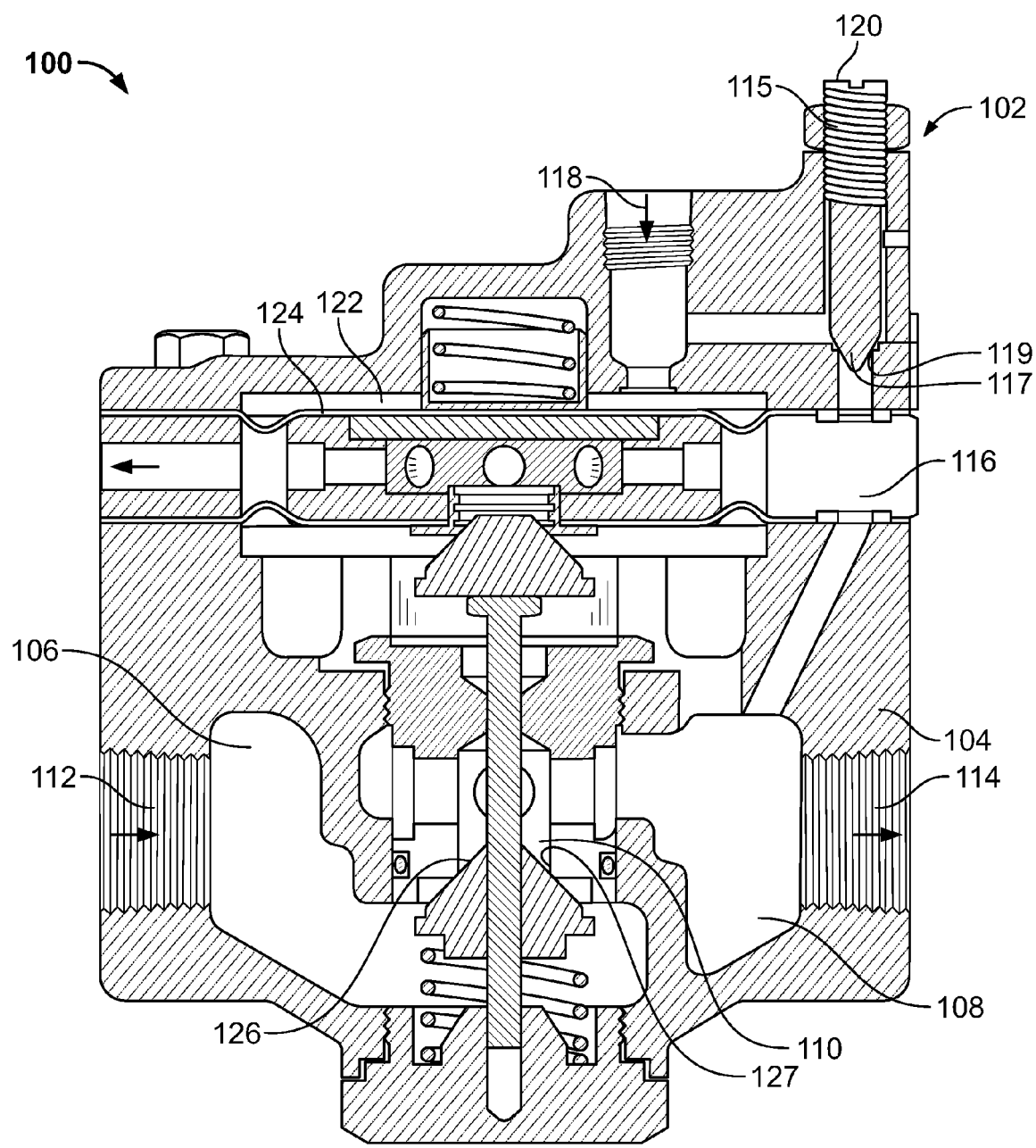
FIG. 1 depicts a known volume booster having a known bypass valve arrangement.

FIG. 1 depicts a known volume booster 100 that includes a known bypass valve 102. The volume booster 100 includes a body 104 that defines an inlet chamber 106 and an outlet chamber 108 that are fluidly coupled via a supply port 110. The inlet chamber 106 has an inlet opening 112 and the outlet chamber 108 has an outlet opening 114. The inlet chamber 106 is fluidly coupled to a supply line (not shown) that supplies a fluid to the volume booster 100. Additionally, the outlet chamber 108 is fluidly coupled to, for example, an actuator (not shown).

The bypass valve 102 includes a movable, adjustable restriction member, screw or plug 115 (hereinafter referred to as the restrictor 115) that threadingly engages the body 104. In the illustrated example, the restrictor 115 has a slot 120 to receive a screwdriver blade or other tool to enable the rotation of the restrictor 115 to adjust the position of the restrictor 115 relative to a bypass restriction passage 116, which is fluidly coupled to the outlet chamber 108. Adjusting the position of the restrictor 115 relative to the bypass restriction passage 116 controls the magnitude of an input pressure (e.g., a pneumatic signal) that activates the volume booster 100. Additionally, the restrictor 115 includes a conical head 117 that engages a corresponding seat 119. The opening between the conical head 117 and the seat 119 provides a quick-opening flow characteristic. Specifically, as the conical head 117 disengages the seat 119, the quick-opening flow characteristic provides for a maximum flow rate change with relatively little movement of the conical head 117 relative to the seat 119.

A pressure input 118 receives a pneumatic signal from a positioner (not shown). The pneumatic signal is associated with a position of a valve (not shown). If the pneumatic signal received by the pressure input 118 is above a predetermined level, the volume booster 100 will be activated. Specifically, the pressure within an upper volume booster chamber 122 increases and acts against an upper diaphragm 124 creating a force. The force on the upper diaphragm 124 moves a supply port valve plug 126 away from a seat 127 to allow fluid to flow from the inlet chamber 106 to the outlet chamber 108 to assist an actuator in moving a valve or other device between an open and/or a closed position. Alternatively, if the pneumatic signal received by the pressure input 118 is below the predetermined level, the pneumatic signal will pass by the bypass valve 102, though the bypass restriction passage 116 and the outlet chamber 108 and into the actuator without activating the volume booster 100 and, thus, the supply port 110 remains closed preventing unnecessary fluid (e.g., air) consumption from the inlet chamber 106.

FIG. 2 depicts an example bypass valve 200. As illustrated in FIG. 2, the bypass valve 200 includes a body 201, an example valve plug, adjustment screw or adjustable restrictor 202 (hereinafter referred to as the restrictor 202) and an insert 204, each of which may be used in conjunction with any suitable apparatus such as, for example, a volume booster, a positioner, a transducer, a controller and/or a valve. In the illustrated example of FIG. 2, the restrictor 202 is depicted as an adjustment screw. However, the restrictor 202 may be any other suitable restrictor such as, for example, a valve plug. The body 201 includes a plurality of passages (e.g., a first passage 206, a second passage 208 and a third passage 210). The body 201 may be separate from or an integral part of any suitable device such as those described above. In this example implementation, the insert 204 is partially positioned within each of the first and second passages 206 and 208.

Figure 4:
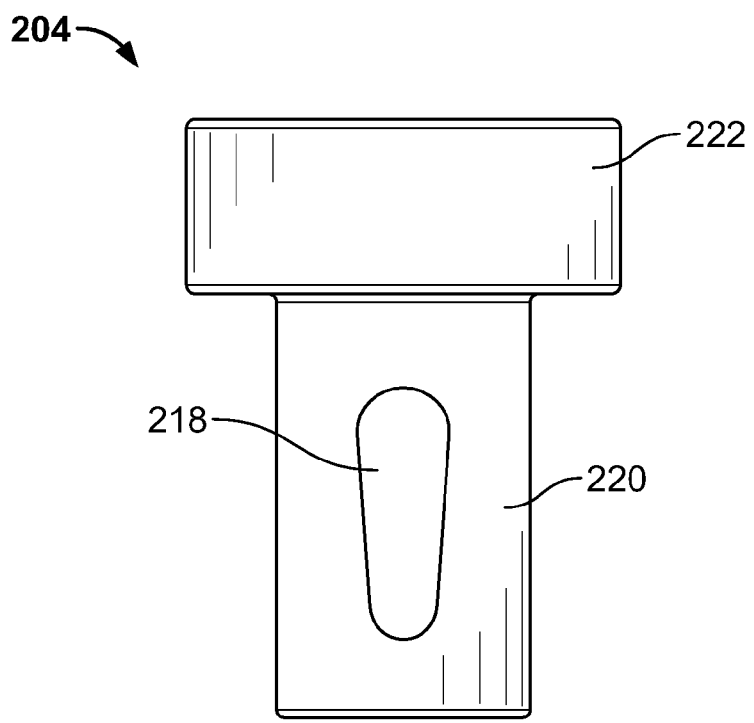
FIG. 4 depicts another view of the example insert of FIGS. 2 and 3.

The insert 204 defines a bore 212 that includes a first opening 214 and a second opening 216, and an opening 218, which is most clearly shown in FIG. 4. The opening 218 is substantially perpendicular to the first and second openings 214 and 216. Additionally, the opening 218 is fluidly coupled to the first passage 206 via the bore 212 and the first opening 214.

The insert 204 is inserted into the body 201 so that the first opening 214 faces the first passage 206 and the opening 218 faces the third passage 210. As discussed in more detail below, the opening 218 is shaped and/or sized to provide a predetermined flow characteristic such as, for example, a linear flow characteristic, an equal percentage flow characteristic and/or a modified flow characteristic, in response to a movement, location or positioning of the restrictor 202 relative to the opening 218.

In this example implementation, the insert 204 has an elongated body 220 and a collar 222. The elongated body 220 is provided with a clip 224 (e.g., a snap-fit clip), positioned substantially opposite the opening 218, that engages a recess 226 defined by the body 201. The interaction between the clip 224 and the recess 226 at least partially holds the insert 204 within the body 201 and assists in maintaining the position of the opening 218 relative to the third passage 210. In other examples, the insert 204 may be provided with any other suitable means to hold the insert 204 within the body 201 such as, for example, the insert 204 may be provided with a groove 312 (FIG. 3) that engages a ridge 227 defined by the body 201 and/or a retaining block (not shown) may be coupled to a face of the body 201 to secure the insert 204 within the body 201.

The insert 204 includes an internal groove or cavity 228 that receives a seal 230 (e.g., an o-ring, a gasket, etc.). The seal 230 may be positioned to provide a sliding seal between the insert 204 and an elongated portion 231 of the restrictor 202 to, for example, substantially prevent fluid from exiting the body 201 via the second passage 208. The seal 230 may be made of any suitable material such as, for example, a synthetic rubber material, or a thermoplastic material, etc. Additionally, the bore 212 includes a seat 232, which may be engaged by an end 234 of the restrictor 202. When the end 234 engages the seat 232, fluid is substantially prevented from flowing from the first passage 206 though the opening 218. The insert 204 may be made of any suitable material such as, for example, a plastic material, a polyoxymethylene material (e.g., Delrin®) or a metal material, etc.

The restrictor 202 is provided with a head 236. A size of a portion of the second passage 208 substantially corresponds to a diameter of the head 236 and a diameter of the bore 212 substantially corresponds to a diameter of the elongated portion 231. In some example implementations, the bore 212 may have a diameter slightly smaller than the diameter of the elongated portion 231 to create a substantially air tight interference fit between the elongated portion 231 and the bore 212. The elongated portion 231 is at least partially inserted into the bore 212. An exterior or outer surface 240 of the elongated portion 231 abuts and/or is substantially adjacent to at least a portion of the opening 218. As discussed in more detail below, the position of the elongated portion 231 relative to the opening 218 covers and/or exposes at least a portion of the opening 218 to vary a fluid flow through the opening 218 from the first passage 206 to the third passage 210.

The head 236 of the restrictor 202 is provided with threads 242 that engage corresponding threads 244 of the body 201. Additionally, the head 236 includes a slot 245 that may accept any suitable tool such as, for example, a screwdriver, to assist in adjusting the position of the restrictor 202 relative to the opening 218. In some examples, the restrictor 202 is provided with a laser mark or any other suitable means to assist in positioning and/or repositioning the restrictor 202 relative to the insert 204 after, for example, removing the restrictor 202 from the body 201.

In this example implementation, a fluid input (e.g., a pressure input) may permit fluid flow in a direction generally indicated by arrow 246 toward the first opening 214. If the end 234 of the elongated portion 231 is engaged with the seat 232, fluid will be substantially unable to pass into the bore 212, through the opening 218 and into the third passage 210. Alternatively, if the end 234 of the elongated portion 231 is not engaged with the seat 232 and at least a portion of the opening 218 is not covered by the exterior surface 240 of the elongated portion 231, fluid will flow into the bore 212, past the end 234, through the opening 218 and into the third passage 210 in a direction generally indicated by arrow 248.

In some examples, the opening 218 is sized and/or shaped to provide a linear flow characteristic in response to the exterior surface 240 of the elongated portion 231 moving relative to the opening 218. A linear flow characteristic is associated with a substantially linear relationship between the rated travel of the restrictor 202 relative to the opening 218 and the fluid flow through the opening 218. The rated travel is the travel distance between a closed position (i.e., a position in which the end 234 of the elongated portion 231 engages the seat 232) and a fully open position (i.e., a position in which the exterior surface 240 of the elongated portion 231 does not cover any portion of the opening 218), where 0% of rated travel is associated with the closed position and 100% of rated travel is associated with the fully open position. For example, if the restrictor 202 is adjusted to or positioned at 50% of rated travel (i.e., 50% open) the flow rate through the opening 218 will be about 50% of the maximum flow rate. Alternatively, if the restrictor 202 is adjusted to or positioned at 80% of rated travel (i.e., 80% open), the flow rate through the opening 218 will be about 80% of the maximum flow rate. More generally, as the restrictor 202 is adjusted, moved or positioned relative to the opening 218, the flowrate through the opening 218 is substantially proportional to the percent of rated travel at which the restrictor 202 is positioned.

In other example implementations, the opening 218 is sized and/or shaped to provide an equal percentage flow characteristic in response to the exterior surface 240 of the elongated portion 231 moving relative to the opening 218. An equal percentage flow characteristic is associated with equal increments of movement of the restrictor 202 producing equal percentage changes in the flow rate through the opening 218 such that the change in flow rate is substantially proportional to the flow rate just before the restrictor 202 is adjusted.

In yet other example implementations, the opening 218 is sized and/or shaped to provide a modified parabolic flow characteristic in response to the exterior surface 240 of the elongated portion 231 moving relative to the opening 218. A modified parabolic flow characteristic provides a substantially equal percentage flow characteristic at relatively low percentages of rated travel (i.e., the end 234 of the elongated portion 231 is relatively close to the seat 232) and an approximately linear flow characteristic at relatively high percentages of rated travel (i.e., the exterior surface 240 of the elongated portion 231 substantially does not cover the opening 218).

In this example, a second seal 252 is initially inserted into the second passage 208 until the second seal 252 engages a surface 254 of the body 201. The second seal 252 at least partially prevents fluid from exiting the body 201 via the second passage 208 once the insert 204 and the restrictor 202 are properly positioned.

Next, the insert 204 is positioned relative to the second passage 208 such that the clip 224 is aligned with the recess 226. The insert 204 is then inserted into at least a portion of each of the first and second passages 206 and 208 until the clip 224 is received by the recess 226 and a surface 314 (FIG. 3) of the insert 204 is adjacent (e.g., sealingly engaged with) the second seal 252. Inserting the insert 204 into the first and second passages 206 and 208 may elastically and/or plastically deform the insert 204 and/or the clip 224 prior to the clip 224 being received by the recess 226. As discussed above, in this example implementation, once the insert 204 is inserted into the body 201, the opening 218, which is opposite the clip 224, faces the third passage 210. The elongated portion 231 of the restrictor 202 is then inserted into the bore 212 and the restrictor 202 is tightened (e.g., turned or rotated) until the end 234 of the restrictor 202 engages the seat 232 and the exterior surface 240 covers the opening 218. Then, the restrictor 202 is calibrated by adjusting the restrictor 202 relative to the insert 204 and/or the body 201 to achieve a desired flow rate through the opening 218.

In some instances, it may be necessary to replace the insert 204 within the body 201 if, for example, a different flow characteristic is desired or for any other suitable reason. To replace the insert 204, the restrictor 202 and the insert 204 are removed from the body 201 by any suitable means. The replacement insert 204 is then installed in the body 201 as described above.

Figure 3:
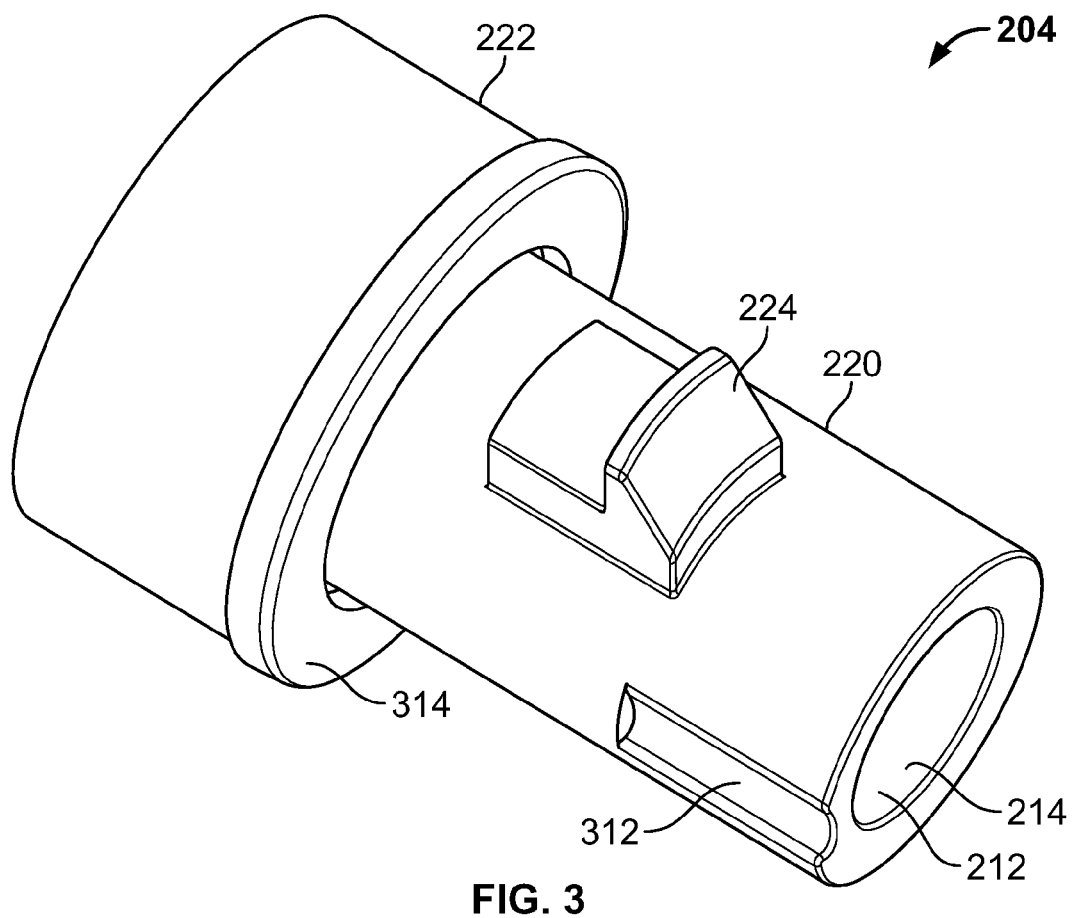
FIG. 3 depicts another view of the example insert of FIG. 2.

FIG. 3 illustrates another view of the example insert 204 of FIG. 2. The example insert 204 has the bore 212 that defines the first opening 214 and the second opening 216 (FIG. 2). Additionally, the insert 204 includes the elongated body 220 and the collar 222 that are substantially coaxial with the bore 212. The elongated body 220 is provided with the clip 224 and the groove 312 that each assist in holding the insert 204 within the body 201 (FIG. 2).

FIG. 4 illustrates another view of the example insert 204 of FIGS. 2 and 3. The illustrated example depicts the relationship between the opening 218, the elongated body 220 and the collar 222. As discussed above, the opening 218 is shaped to provide a predetermined flow characteristic in response to moving the elongated portion 231 (FIG. 2) relative to the opening 218. The opening 218 may be any other suitable size and/or shape (e.g., a circle, an oval, an ellipse, a rectangle, etc.) and may be associated with any suitable flow characteristic.

Figure 5:
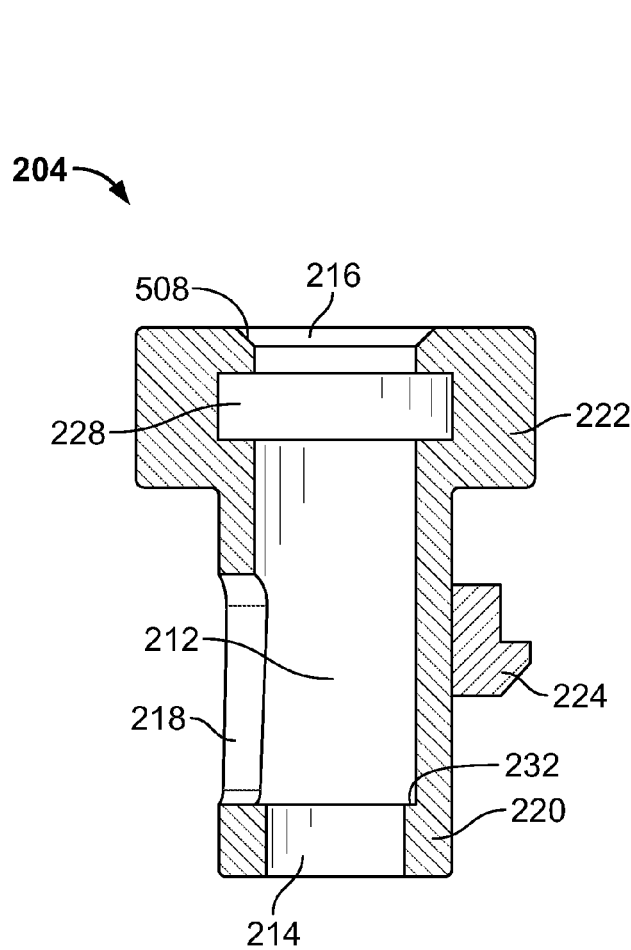
FIG. 5 depicts a cross-sectional view of the example insert of FIGS. 2 and 3.

FIG. 5 illustrates a cross-sectional view of the example insert 204 of FIGS. 2, 3 and 4. The illustrated example depicts the relationship between the bore 212, the first opening 214 and the second opening 216. Additionally, the example implementation depicts the relationship between the elongated body 220, the collar 222, the clip 224 and the opening 218. The opening 218 is substantially perpendicular to the first and second openings 214 and 216. In other examples, the opening 218 may be in any other suitable position relative to the first and/or second openings 214 and 216. As discussed above, the insert 204 includes the internal groove or cavity 228 that receives the seal 230 (FIG. 2) and the seat 232 that may be engaged by the end 234 (FIG. 2) of the restrictor 202 (FIG. 2). In other example implementations, the inert 204 may not include the internal groove or cavity 228 and, thus, the insert 204 would not be provided with the seal 230. Additionally, the bore 212 may be sized to create a substantially air tight seal around the elongated portion 231 of the restrictor 202. Specifically, the bore 212 may be made of a smooth plastic that may partially deform when the restrictor 202 is inserted into the bore 212. The insert 204 also includes a chamfer 508 that is adjacent the second opening 216 and which may correspond to a chamfer 608 (FIG. 6) of the restrictor 202. In this example implementation, the elongated body 220 and the collar 222 are substantially cylindrical. However, in other examples, any other suitable shape and/or design can be used instead.

Figure 6:
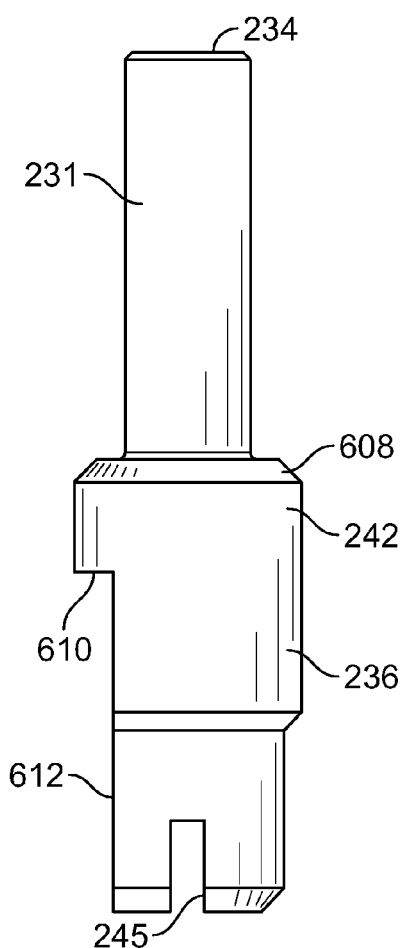
FIG. 6 depicts another view of the example restrictor of FIG. 2.

FIG. 6 depicts the example restrictor 202 of FIG. 2. The restrictor 202 includes the elongated portion 231 and the head 236. The size and/or shape of the elongated portion 231 substantially corresponds to the bore 212 (FIG. 2). The elongated portion 231 may be any suitable shape and/or size such as a cylindrical prism, a rectangular prism, a triangular prism, etc. As discussed above, the elongated portion 231 includes the end 234 that may engage the seat 232 (FIG. 2) to substantially stop a fluid flow through the opening 218 (FIG. 2).

The head 236 includes the chamfer 608, a stepped portion 610, a flat surface 612 and the slot 245. The chamfer 608 may correspond to the chamfer 508 (FIG. 5) of the insert 204 (FIG. 2), and the substantially flat surface 612 may include a laser marking or any other suitable means to assist in identifying the position of the restrictor 202. Specifically, the marking may assist an operator or technician in positioning the restrictor 202 in substantially the same position relative to the opening 218. Additionally, the head 236 includes the threads 242 that, as discussed above, correspond to the threads 244 (FIG.

2) defined by the body 201 (FIG. 2). In other examples, the threads 242 may be positioned on any other suitable surface on the restrictor 202.

The slot 245 may be sized and/or shaped to accept a tool such as, for example, a screwdriver, that engages the slot 245 to assist in adjusting the position of the restrictor 202 relative to the opening 218 (FIG. 2). The slot 245 may be any suitable shape and/or size. The restrictor 202 may be made of any suitable material such as, for example, a plastic material, a steel material, an aluminum material (e.g., A360), a stainless steel material (e.g., 18-8 SST), a brass material, etc.

FIG. 7 depicts an alternative example bypass valve 700. As illustrated in FIG. 7, the bypass valve 700 includes a body 701, an example valve plug, adjustment screw or adjustable restrictor 702 (hereinafter referred to as the restrictor 702) and an example insert 704, each of which may be used in conjunction with any suitable apparatus such as, for example a volume booster, a positioner, a transducer, a controller, and/or a valve. The body 701 includes a plurality of passages (e.g., a first passage 706, a second passage 708 and a third passage 710). The body 701 may be separate from or an integral part of any suitable device such as those described above. Specifically, if the body 701 is separate from the device, the body 701 may be coupled to the device with a plurality of fasteners (not shown). As the plurality of fasteners are tightened, a seal 711 (e.g., an o-ring) creates a seal between the body 701 and the device. In this example implementation, the restrictor 702 is positioned partially within each of the first and second passages 706 and 708 and the insert 704 is at least partially positioned within the third passage 710.

Figure 8:
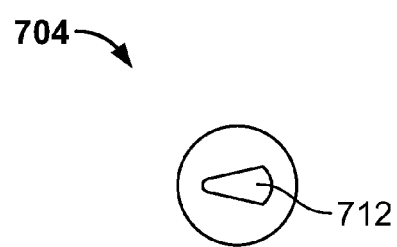
FIG. 8 depicts another view of the alternative example insert of FIG. 7.

The insert 704 defines an opening 712 that may be substantially similar in size and/or shape to the opening 218 (FIG. 2) and/or may be substantially similar to the opening 712 as depicted in FIG. 8. In contrast to the insert 204 (FIG. 2) described above, the insert 704 is positioned substantially perpendicular to the restrictor 702. The insert 704 may be positioned in any suitable position within the third passage 710 and may be integrally coupled to the body 701. Additionally, as described above, the size and/or shape of the opening 712 provides a predetermined flow characteristic in response to moving the restrictor 702 relative to the opening 712.

If the body 701 is separate from the device, to replace the insert 704, the fasteners are loosened and the body 701 is detached from the device. Next, the insert 704 is removed from the third passage 710 and the replacement insert 704 is inserted into the third passage 710 so that the opening 712 abuts and/or is substantially adjacent to the restrictor 702. The body 701 is then repositioned relative to the device and the plurality of fasteners are retightened.

The restrictor 702 includes a head 716 and an elongated body 718. The head 716 threadingly engages a corresponding threaded surface 720 of the body 701 and an exterior surface 722 of the elongated body 718 abuts and/or is substantially adjacent to the opening 712. In some examples, the body 701 and/or the insert 704 may be provided with a seal (not shown) to substantially prevent fluid from exiting the second passage 708 as described above and/or to provide a sliding seal between the insert 704 and the elongated body 718. Moving the elongated body 718 relative to the opening 712 changes a fluid flow through the opening 712.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. An apparatus to control a fluid flow characteristic of a fluid regulator bypass valve, comprising:
    an insert having a body sized to be inserted in a passage of a bypass valve, wherein the body includes an opening to fluidly couple a bore of the body to an outer surface of the body, the opening being shaped to produce a predetermined flow characteristic in response to at least a portion of a restrictor of the bypass valve being rotated relative to the opening to vary a fluid flow through the opening and the bypass valve, wherein the restrictor is to threadably engage the bypass valve.

2. The apparatus as defined in claim 1, wherein the bore of the body is to receive the restrictor.

3. The apparatus as defined in claim 1, wherein the restrictor is adjacent to at least a portion of the opening.

4. The apparatus as defined in claim 1, wherein the passage of the bypass valve is different from a second passage of the bypass valve that is to receive the restrictor of the bypass valve.

5. The apparatus as defined in claim 1, wherein the body comprises an elongated body through which the opening is defined.

6. The apparatus as defined in claim 1, wherein the body comprises an elongated body having a collar.

7. The apparatus as defined in claim 6, wherein the elongated body defines a second opening of the bore that is substantially perpendicular the opening.

8. The apparatus as defined in claim 1, wherein the bore includes at least one groove that is to receive a seal.

9. The apparatus as defined in claim 1, wherein the body defines a seat to to be engaged by the restrictor.

10. The apparatus as defined in claim 1, wherein the predetermined flow characteristic is at least one of a linear flow characteristic, an equal percentage flow characteristic, or a modified flow characteristic.

11. The apparatus as defined in claim 1, wherein the insert is integrally coupled to the passage of the bypass valve.

12. The apparatus as defined in claim 1, wherein the insert is comprised of at least one of a plastic material or a metal material.

13. The apparatus as defined in claim 1, wherein the restrictor is externally accessible to enable manual field adjustment.

14. An apparatus to control a fluid flow characteristic of a fluid regulator bypass valve, comprising:
    an insert having a body sized to be inserted in a passage of a bypass valve, wherein the body includes an opening to fluidly couple a bore of the body to an outer surface of the body, the opening being shaped to produce a predetermined flow characteristic in response to at least a portion of a restrictor of the bypass valve being rotated relative to the opening to vary a fluid flow through the opening and the bypass valve, wherein the insert further comprises a clip that is to engage a recess of the bypass valve to hold the insert in the bypass valve.

15. The apparatus as defined in claim 14, wherein the clip is positioned substantially opposite the opening.

16. An apparatus to control a fluid flow characteristic of a fluid regulator bypass valve, comprising:
    an insert having a body sized to be inserted in a passage of a bypass valve, wherein the body includes an opening to fluidly couple a bore of the body to an outer surface of the body, the opening being shaped to produce a predetermined flow characteristic in response to at least a portion of a restrictor of the bypass valve moving relative to the opening to vary a fluid flow through the opening and the bypass valve, wherein the insert further comprises a clip that is to engage a recess of the bypass valve to hold the insert in the bypass valve, wherein the clip is a snap-fit clip.

17. An apparatus to control a fluid flow characteristic of a fluid regulator bypass valve, comprising:

an insert having a body sized to be inserted in a passage of a bypass valve, wherein the body includes an opening to fluidly couple a bore of the body to an outer surface of the body, the opening being shaped to produce a predetermined flow characteristic in response to at least a portion of a restrictor of the bypass valve moving relative to the opening to vary a fluid flow through the opening and the bypass valve, wherein the insert comprises a groove to engage a ridge of the bypass valve.

* * * * *